US010669692B2

(12) United States Patent
Lawson

(10) Patent No.: US 10,669,692 B2
(45) Date of Patent: Jun. 2, 2020

(54) PIPELINE PADDING MACHINE ELEVATOR SELF-CLEANING SYSTEM

(71) Applicant: Jared Lawson, Killdeer, ND (US)

(72) Inventor: Jared Lawson, Killdeer, ND (US)

( * ) Notice: Subject to any disclaimer, the term of this patent is extended or adjusted under 35 U.S.C. 154(b) by 261 days.

(21) Appl. No.: 15/823,475

(22) Filed: Nov. 27, 2017

(65) Prior Publication Data
US 2019/0161937 A1    May 30, 2019

(51) Int. Cl.
| *E02F 3/54* | (2006.01) |
| *E02F 5/22* | (2006.01) |
| *F16L 1/028* | (2006.01) |
| *E02F 9/14* | (2006.01) |
| *F16L 1/06* | (2006.01) |

(52) U.S. Cl.
CPC ............... *E02F 3/54* (2013.01); *E02F 5/223* (2013.01); *E02F 5/226* (2013.01); *F16L 1/028* (2013.01); *E02F 9/14* (2013.01); *F16L 1/06* (2013.01)

(58) Field of Classification Search
CPC ... E02F 3/54; E02F 5/223; E02F 5/226; E02F 9/14; F16L 1/028; F16L 1/06; B65G 45/10; B65G 39/073; B65G 45/18; B65G 45/12; B65G 45/14; B65G 45/16
USPC .............. 37/394, 208, 237, 305, 422, 463; 198/493, 494, 496, 497, 498, 499
See application file for complete search history.

(56) References Cited

U.S. PATENT DOCUMENTS

| 1,560,716 A | 11/1925 | Newdick |
| 1,681,089 A | 8/1928 | Bottomley et al. |
| 2,857,691 A | 10/1958 | Curran |
| 2,947,096 A | 8/1960 | Cummings et al. |
| 2,974,795 A | 3/1961 | Behnke et al. |
| 2,987,891 A | 6/1961 | Phillips |
| 3,147,850 A * | 9/1964 | Ronceray ............... B65G 15/44 198/801 |
| 3,270,443 A | 9/1966 | Duke et al. |
| 3,331,149 A | 7/1967 | Rapp |
| 3,378,133 A | 4/1968 | Anderson et al. |
| 3,452,458 A | 7/1969 | Campbell et al. |
| 3,738,031 A | 6/1973 | Lott |
| 3,927,759 A * | 12/1975 | Hyler ..................... B65G 19/22 198/719 |
| 3,971,146 A | 7/1976 | Hyler |
| 4,053,997 A | 10/1977 | Stuller et al. |
| 4,057,917 A | 11/1977 | Burrows |

(Continued)

*Primary Examiner* — Justin M Jonaitis

(57) ABSTRACT

A self-cleaning elevator flight bracket system is described for attachment to an elevator or conveyor flight for pipeline padding and backfill operations. The system is designed for bolt-on installation to padding equipment elevator flights, or cleated conveyor feeders. Built-up soil, clay, and other debris, which interfere with elevator drive mechanisms, are self-cleaned with the system. The assembly is universal to fit a variety of existing bolt patterns on elevator flight plates or feeder conveyor cleats. Flexible cables are directed to engage and remove excessive backfill material build-up. While operating padding machinery in heavy soil, or clay, material builds up in the space between the elevator flights and the elevator side wall. This leads to impeding the drive mechanism. With the use of the presently described elevator flight bracket and flexible cable or fingers, the upward movement of the elevator acts to self-clean the machinery and allows for longer operation.

7 Claims, 9 Drawing Sheets

(56) References Cited

U.S. PATENT DOCUMENTS

| | | |
|---|---|---|
| 4,159,583 A | 7/1979 | Black et al. |
| 4,179,024 A | 12/1979 | Boersma |
| 4,286,705 A | 9/1981 | Boersma |
| 4,294,026 A | 10/1981 | Welch |
| 4,377,365 A | 3/1983 | Layh |
| 4,616,957 A | 10/1986 | Burrows et al. |
| 4,633,602 A | 1/1987 | Layh et al. |
| 4,662,507 A * | 5/1987 | Veenhof ............... B65G 45/12 |
| | | 15/256.5 |
| 4,664,791 A | 5/1987 | McClain et al. |
| 4,861,461 A | 8/1989 | Utterback |
| 4,865,182 A * | 9/1989 | Nolte ............... B65G 15/42 |
| | | 198/699 |
| 4,912,862 A | 4/1990 | Bishop et al. |
| 4,955,756 A | 9/1990 | Klamar |
| 5,084,991 A | 2/1992 | Cronk, Jr. |
| 5,097,610 A | 3/1992 | Bishop |
| 5,120,433 A | 6/1992 | Osadchuk |
| 5,261,171 A | 11/1993 | Bishop |
| 5,271,168 A | 12/1993 | Wilson, Sr. et al. |
| 5,280,833 A * | 1/1994 | Robin ............... B65G 17/086 |
| | | 198/494 |
| 5,421,108 A | 6/1995 | Stewart |
| 5,430,962 A | 7/1995 | Osadchuk |
| 5,479,726 A | 1/1996 | Bishop |
| 3,256,973 A | 6/1996 | Gonski |
| 5,692,595 A * | 12/1997 | Gilbert ............... B65G 45/12 |
| | | 198/497 |
| 5,741,087 A | 4/1998 | Osadchuk |
| 5,746,302 A * | 5/1998 | Bowman ............... B65G 45/18 |
| | | 15/256.5 |
| 5,788,168 A | 8/1998 | Gilbert et al. |
| 5,846,026 A | 12/1998 | Gilbert et al. |
| 5,938,373 A | 8/1999 | Scudder |
| 5,979,573 A | 11/1999 | Osadchuk |
| 5,979,574 A | 11/1999 | Osadchuk |
| 6,029,378 A | 2/2000 | Cronk, Jr. |
| 6,082,471 A | 7/2000 | Osadchuk |
| 6,158,925 A | 12/2000 | Schleining et al. |
| 6,227,311 B1 | 5/2001 | Osadchuk |
| 6,857,208 B2 | 2/2005 | Gandhi et al. |
| 7,073,661 B2 | 7/2006 | Wilmo et al. |
| 7,186,059 B2 | 3/2007 | Barnes |
| 7,927,059 B2 | 4/2011 | Grassi et al. |
| 8,869,972 B2 | 10/2014 | Shah |
| 9,169,898 B2 * | 10/2015 | Morgan ............... B21D 39/04 |
| 10,343,877 B2 * | 7/2019 | Cilliers ............... F16L 23/0283 |
| 2002/0102164 A1 | 8/2002 | Osadchuk |
| 2004/0226196 A1 | 11/2004 | Leffew et al. |
| 2007/0000156 A1 | 1/2007 | Greenberg et al. |
| 2008/0092411 A1 | 4/2008 | Guth et al. |
| 2013/0043107 A1* | 2/2013 | Shah ............... E02F 3/6481 |
| | | 198/714 |
| 2016/0145831 A1 | 5/2016 | Dermody |

\* cited by examiner

PIPELINE PADDING MACHINE ELEVATOR SELF-CLEANING SYSTEM

BACKGROUND

In the oil and gas industry, pipeline projects are invested in and developed in order to add more capacity to the energy transmission system, increase outflow volumes, and to replace aging infrastructure. Construction is typically undertaken during the spring and summer and projects are brought on-line and put into service in the fall and winter. Pipelines are developed in order to meet supply and demand needs for transportation of natural gas, liquefied natural gas (LNG), crude oil, heating oil, fuel oil, propane, and other petroleum products as well as drinking water and water main infrastructure. New projects add miles of pipeline capacity for the millions to billions cubic feet per day of natural gas production, thousands to million barrels of oil production, and are constructed according to economic feasibility, permitting, state and federal regulation, and environmental impact. Replacement of pipelines is undertaken to fix integrity problems found during hydrostatic pressure testing, and to address known defects such as corrosion, cracks, insufficient padding, leakage, emissions, as well as to upgrade outdated infrastructure.

During the construction and laying of underground pipelines, a trench or ditch is excavated, the pipeline is assembled and then lowered into the ground. The pipeline is covered up with dirt, soil or backfill padding material during the process of burying the pipeline. Heavy equipment such as an excavator, backhoe loader, or bulldozer, may be used to carefully bury the pipeline. However, extreme caution must be exercised in order to not damage or break the pipeline by causing impact with large stones or other debris. Additionally, it is important to lay and cover the pipeline with sufficient padding material and eliminate contact with rocks. An extremely efficient method of burying a pipeline is to utilize a specialized piece of equipment called a pipeline padding machine to pad or bury the pipeline with carefully processed soil and backfill material that does not contain large rocks, particles, or other debris. Pipeline padding machines or padding equipment operate by scooping, ingesting, self-loading, feeding or elevating backfill soil near the pipeline trench, separating, vibrating, screening, crushing, or removing rocks and debris, and then conveying, expelling and depositing the backfill padding material back down over, under and around the pipeline without damaging the critical pipeline integrity, pipeline welds, valves, components, and important anti-corrosive coatings.

The elevator or self-loading conveyor part of the padding machine that initially picks up the backfill material works by engaging horizontally arranged elevator flights or cleats attached to an endless conveyor chain driven mechanism. The flights scoop up soil and upwardly elevate the backfill material into the machine for screening and separating out rocks and other debris. However, when operating in wet soil conditions, or excessive mud or clay, material will build up on the padding machine elevator drive chain and drive mechanism causing clogging, strain, slowdown and eventual failure. To prevent build up, the machine operator is forced to frequently shut down the machinery for cleaning and maintenance. Frequent work stops and downtime are costly to the machine operator in terms of lost productivity and missed pipeline project development deadlines, therefore a solution to prevent clay and mud build up is needed.

SUMMARY

A highly efficient method of cleaning and maintaining operability of the padding machine elevator, feeder, or self-loading conveyor is through the use of a self-cleaning mechanism. A preferred method is to install bolt-on bracket plates with flexible steel cables or fingers, directed to engage and remove built up material on the elevator. The bolt on attachment bracket is designed to fit existing padding machine elevator flight or loading conveyor cleat bolt patterns and does not require any further modification. A particularly troublesome area for soil and clay build up is the gap area or channel space between the elevator flights and the elevator side wall, or between the self-loading feeder conveyor and the feeder side walls. Typically the machine operator will observe dirt or clay building up underneath the elevator or conveyor drive chain, causing the drive chain to bow upwards, become distorted in alignment, and become clogged with mud and clay, causing degraded performance, loss of power, and potential mechanical failure. With operation in heavy, wet, clayey backfill material, the padding machinery is only able to be operated for short periods of time (i.e., less than thirty (30) minutes), before requiring shutdown for cleaning. However, with the use of self-cleaning bolt on bracket plate mechanisms, the operator is able to increase uptime and run the machine for much longer periods of time.

The presently described invention is a self-cleaning, bolt on bracket system for attachment to padding machine elevator flights or self-loading feeder conveyor cleats. The mechanism installs by bolting on a bracket to existing bolt patterns found on padding machine elevators or cleats and does not require further modification. The bracket enables self-cleaning of built up dirt, soil, clay, and other debris from the padding machine elevator drive. Advantages are immediately apparent in increased machinery uptime and the reduction in time spent for cleaning and maintenance. The bolt-on bracket is available in a variety of plate sizes, configurations, and bolt patterns to fit available padding machinery. Flexible cable, wire rope, or scooping fingers are directed by the bracket fixture to engage and clear away built up material in the gap or channel space between the ends of the padding machine elevator flights and the elevator side walls. The upward movement of the elevator flights engages the flexible cables or fingers into the built up soil, clay, and other debris, and self-cleans the machinery and drive mechanism, leading to longer sustained operation without frequent interruption and shutdown for cleaning.

DETAILED DESCRIPTION

Figure 1:
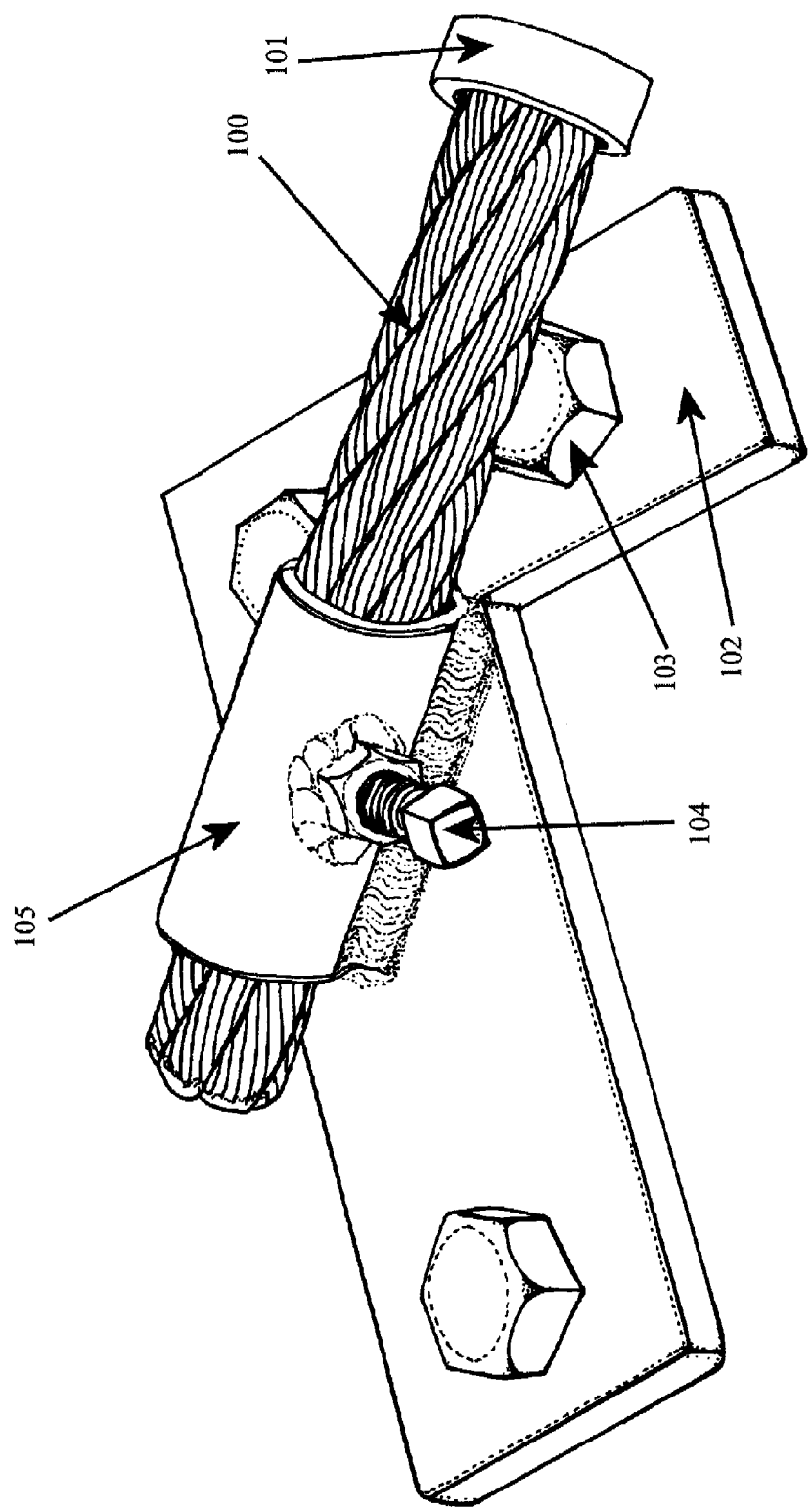
FIG. 1 is a close-up view of an individual bolt-on bracket plate mechanism, flexible wire cable directed at an angle with end cap, and adjustable spacer fixture with set screw for the pipeline padding machine elevator self-cleaning system. The L-shaped mounting plate is comprised of a three (3) hold bolt pattern specifically designed to bolt onto the padding machine elevator flight plate.

Pipeline construction begins with surveying the route and clearing vegetation, rocks, and other debris and then grading the right of way with heavy equipment and tractors. Thereafter, a trench is excavated and sections of the pipeline are brought in and stringed alongside the trench. The pipeline is then aligned, fitted, welded, coated with anti-corrosion coating, and ultimately lowered into the trench with pipelayers or sideboom equipment. The next step, which is highly relevant to the present invention, involves padding, covering and backfilling the pipeline with excavated soil and returning topsoil back over the original area. The pipeline is carefully padded underneath, around and on top of, during the backfill process with soil or other material that does not contain potentially damaging rocks or other debris, which could cause damage to the pipeline integrity, pipeline welds, valves, components, or anti-corrosive coating, resulting in catastrophic failure. It is essential that backfill or padding material is mechanically screened, sorted, or sifted to ensure that rocks and other debris over a certain size are removed. Therefore, the use of pipeline padding equipment, which mechanically elevate, self-load, and feed backfill material into the machine and sift out, screen, separate, vibrate, or crush, rocks and debris, and convey or discharge fine grained soil back over the pipeline, is widely accepted as a preferred method for backfilling the pipeline.

During pipeline trench excavation, the soil removed and deposited alongside the trench in a continuous pile of dirt and debris, which will eventually be used during the backfilling process. Depending on pipeline location and environmental conditions, different soil types and characteristics may be encountered; the soil may be dry or wet, differ in permeability, contain stones, rocks, or other debris, etc., be finely, or coarsely grained, have the potential for erosion, or be poorly or well-drained. Of particular relevance to the pipeline construction crew is the presence of large rocks, stones, and other debris which may cause mechanical damage to the pipeline during backfilling operations and burying the pipeline. Another important factor is whether the backfill soil material is clayey, wet, or mud-like and will therefore present additional problems with the padding machinery during backfill. Heavy clayey soils tend to harden when exposed to sunlight, or are otherwise mechanically disturbed, or exposed, causing the water or moisture content to evaporate. Hardened clay build-up is particularly detrimental to the drive mechanisms and other moving parts of padding machinery. Typically, the machine operator, when encountering clay or muddy soil conditions, will be forced to shut down equipment and clean off built-up, hardened clay or soil. Clay build-up will initially cause the elevator drive mechanism of padding machines to run slower, malfunction, and if not attended to, eventually cause mechanical failure or breakage. Clearly a solution is needed to prevent clay or mud build-up on the elevator drives of padding machinery.

A padding machine operator who encounters clayey, wet, or muddy soils is constrained to run the equipment for a short period of time, i.e., up to thirty (30) minutes, and then stop work, shutdown the equipment, and clean off build-up material from the drive chains, shafts, and elevator flight mechanisms. A high-pressure water jet or power washing is typically used to blast away clay and mud and to wash the equipment. However, work stoppage for power washing consumes valuable production time. After cleaning and resetting the machine, the operator may proceed with running backfilling operations for another short period of time, followed by another shutdown for cleaning and power washing. At the end of the day, the machine operator is faced with lost productivity. This is highly costly, where padding machine operation costs, lease rates, and machine operator labor rates, can run in the hundreds to thousands of dollars an hour. Therefore, a means to run pipeline padding machinery for longer, uninterrupted periods of time, without stoppage for cleaning and removing clay and mud build up would be highly valuable.

The present invention aims to solve these problems with a self-cleaning approach to heavy soil, clay, mud and other build-up that occurs during padding machine operation. The mechanism described here is designed to work as a bolt-on modification to existing padding machinery. No other modification or physical alteration is required beyond simply bolting on the mechanism to the padding machine' elevator flights, which function to lift dirt, soil and backfill material up and into the padding machine, for sorting and filtering out rocks and debris, and for eventual discharge of fine grain soil or padding material over the pipeline. The present system is designed to self-clean the part of the pipeline padding equipment used for ingesting the backfill material. Padding equipment typically utilized self-loading mechanism, cleated conveyors, elevators, feeders, or drum feed mechanism to ingest and load backfill material into the machine for screening, crushing, or separating out excessively large rocks and debris from the backfill material to be eventually discharged over the pipeline to be buried in the trench.

The presently described system, method or bracket mechanism is designed to be bolted onto the padding machine conveyor elevator flights or cleats which function to scoop up, load, feed and ingest the backfill soil and material. Preferably, a bracket is installed and bolted on in pairs, one on each left and right side of a given elevator flight plate or cleat, to engage the gaps on each side of the elevator flight side wall. A pair of brackets may be attached to the elevator in a single pair, or additional multiple pairs of brackets may be installed and bolted on at various intervals around the endless elevator conveyor drive, which turns in an upwards direction to lift and scoop up backfill material and soil into the machine. A preferred interval of brackets may be installed at every third elevator flight on the machine.

The self-cleaning activity of the bracket is realized through the endless conveyor belt turning action of the elevator flight assembly of the padding machine. As the elevator turns to lift backfill material upwards, by scooping up dirt in the elevator flights, the presently described bracket directs self-cleaning fingers or flexible cable into the gaps, channel space, and areas of the machine typically prone to clay, mud, and other debris build up. The bracket is designed to engage flexible wire cables into the space or gap between the elevator flights and the elevator side walls. In these gaps or channels on either side of the elevator flights, heavy soil, clay, or mud is highly likely to cause problematic build-up and begin to interfere with the elevator drive mechanism and drive chain. The build-up is first observed to cause the drive chain to bow upwards under the strain and mechanical interference of the clay and mud. Further symptoms include the slowdown of the machine drive train, increased strain on the electric or hydraulic drive motors, and potential failure of the equipment. These problems are avoided with the self-cleaning action of the presently described bracket system and method which automatically removes material build up as the elevator flights turn upwards along the conveyor drive mechanism. Clay, heavy soil, and other debris are continuously removed and self-cleaned from the gaps or channels by the turning action of the elevator drive. The flexible wire cables, fingers or wire rope are directed by the bracket into the gaps or space between the elevator flights and side wall in order to lift out and remove build-up. As the elevator turns, the brackets, which are bolted onto the elevator flights, direct and engage flexible cable or fingers into the gaps or space between the flights and the elevator side wall, and therefore self-clean the build-up of backfill material. With the installed self-cleaning mechanism, the pipeline padding machine is able to be operated for far longer periods of time as the brackets keep the elevator drive mechanism free and clear of material build up.

The self-cleaning bracket mechanism is designed to be available in a variety of bolt patterns, plate shapes and sizes, and configurations to fit existing pipeline padding machinery. The intent is to provide the machine operator with an easily accessible, bolt-on modification option for handling and improving operation in heavy or clayey soil conditions. The bracket is preferably available and adjustable to fit the operator's padding machine elevator flight bolt pattern, elevator flight size, and gap to elevator side wall. Mounting the bracket to the padding machine involves the simple installation process of bolting on at least one pair of brackets to each left and right side of the elevator flight plates. Multiple pairs of brackets may be installed to improve the self-cleaning action of the mechanism. A preferred arrangement may be an installed pair of brackets at every third elevator flight plate on the elevator conveyor of the padding machine. The bracket scoops out and clears away material build up with an engaging part such as flexible cable, wire rope, finger or sets of fingers, scoops, grips, blades, claws, teeth, or tines. The engaging part, i.e., flexible wire cable or fingers, etc., may be available in a variety of different diameters, lengths, and materials of different hardness and tensile strength for engaging and removing the clay or mud build-up. Additionally, the bracket may be adjustable to change the angle and position of the flexible cable or fingers in order to properly engage the gap and space between the elevator flight and the elevator side wall. The length of the flexible cable or fingers may be adjusted with a set-screw that allows the cable to be slid back and forth. The angle of the cable or fingers may preferably be adjusted with a fixture base that rotates and is locked with a set screw. A preferred angle for the cable may be set at twenty-seven degrees relative to the elevator flight plate. The choice of bracket configuration is dependent on the operator's preferences, machine operation, and observed soil conditions at the work site. A preferred embodiment of the bracket is a steel plate cut to fit the existing machinery elevator flight bolt pattern, a steel pipe and spacer fixture welded to the plate, and mounting or adjusting the pipe-fixture at an angle for directing and securing the wire cable or fingers at the needed spacing and position to engage the elevator gap area. A bolt and nut may be utilized on the pipe-fixture for securing and adjusting the wire cable. After installation, the bracket and fixture may be further finely adjusted in order to set the optimal angle and position of the flexible cable or fingers to properly engage the built-up material between the elevator flights and the elevator side wall.

The bracket plate of the self-cleaning system is universal and designed to fit a variety of different elevator flight bolt patterns for currently available pipeline padding machines or padding equipment. The universal bracket is also designed to fit any available self-loading elevators, hoppers, conveyors, or feeding mechanism for available pipeline padding equipment. The bracket plate may be available in a rectangular shape such as an L-shaped plate with a bolt-pattern to fit the padding machine elevator flight plates. The L-shaped plate may have a three (3) bolt pattern. An alternative bracket plate shape may be available in a rectangular U-shaped plate with a four (4) bolt-pattern designed to fit existing padding machine elevator flight plates. Alternative bracket plate shapes and bolt patterns are also available with the system to fit any type of available padding equipment elevator, self-loading conveyor, or feeding mechanism. The brackets may be available in left (L) and right (R) side shaped plates in order to fit the left and right side of the elevator flight plates, respectively. The length of the flexible cable or engaging part may be adjusted and slid back and forth with a set-screw or set-bolt to properly fit and engage the built-up material in the gap or channel space between the elevator flight plates and the elevator side wall.

In FIG. 1 an individual bracket plate is shown for use in the pipeline padding machine elevator self-cleaning system or material loading cleated feeder conveyor self-cleaning system. The bracket is constructed with an L-shaped mounting plate 102, preferably made of steel of an appropriate thickness (i.e., 14 gauge, 12 gauge, ⅛-inch 3/16-inch, ¼-inch steel plate, etc.) to effectively mount to the elevator flights or cleats of the loading conveyor on a padding machine. The steel plate may be cut to the appropriate size and shape with a plasma cutter, horizontal band saw, angle grinder, or oxygen-acetylene cutting torch. The bolt pattern 103 is configured with a three (3) bolt configuration for fitment and installation onto the elevator flights or the conveyor cleats of the pipeline padding machine for easy bolt-on installation. The flexible wire cable 100 is directed at an angle to engage the space or channel gap between the elevator flights or conveyor cleats and the elevator side wall. The tip of the flexible wire cable 100 is comprised of a steel cap 101 in order to keep the end of the cable from becoming frayed. The cap 101 also improves the removal and engagement of built up mud and clay in the space or channel gap between the elevator flights and the elevator side wall. An adjustable spacer fixture 105 secures the flexible wire cable 100 to the mounting plate 102. The length of the cable 100 may be adjusted with the set screw 104, and slid back and forth in order to properly engage the space or channel gap between the elevator flights and the elevator side wall. The overall design of the bracket is to allow simple bolt-on installation onto the padding machine elevator flights or cleats, is adjustable to properly engage built up mud or clay, and will improve the padding machine functionality through self-cleaning action, by the upwards turning motion of the elevator conveyor, in heavy, wet, or muddy soil conditions.

Figure 2:
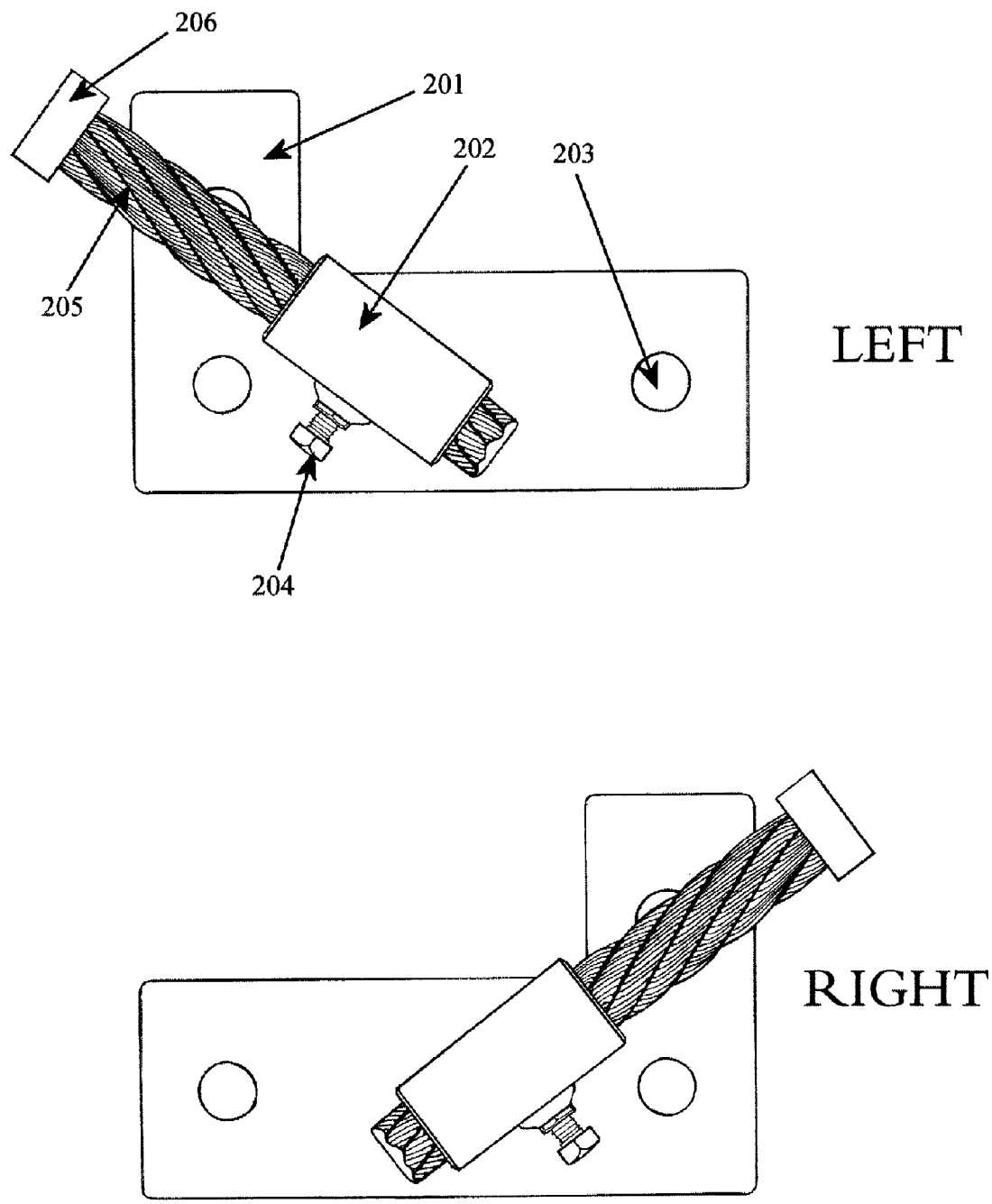
FIG. 2 is a view of a pair of left (L) and right (R) side bolt-on bracket plates, with an L-shaped plate configuration, three (3) hole bolt pattern, and with flexible wire cables directed at an angle and mounted with an adjustable spacer fixture for use in the pipeline padding machine elevator self-cleaning system.

In FIG. 2, a pair of L-shaped left (L) and right (R) side brackets are shown for use in the pipeline padding machine elevator or cleated loading conveyor self-cleaning system. The brackets are preferably installed in pairs, such that the left (L) side bracket is mounted on the left side of the elevator flight, and the right (R) side bracket is mounted to the right side of the same elevator flight or conveyor cleat. The mounting brackets 201 are configured in the L-shape with a three (3) bolt hole pattern 203 for installation onto the padding machine elevator flights or conveyor cleats. The flexible wire cable 205 is directed at an angle to engage the space or channel gap between the elevator flights or loading conveyor cleats and the side wall. A cap 206 is mounted at the end of the flexible cable 205 to keep the cable 205 from becoming frayed as well as to improve removal of built up soil, clay and mud. An adjustable spacer fixture 202 secures the flexible cable 205 to the mounting plate 201. The cable 205 is adjustable with the set-screw 204 and may be lengthened or shortened in order to properly engage the space or channel gap on the padding machine between the elevator flights, or cleated conveyor, and the elevator or conveyor side wall.

Figure 3:
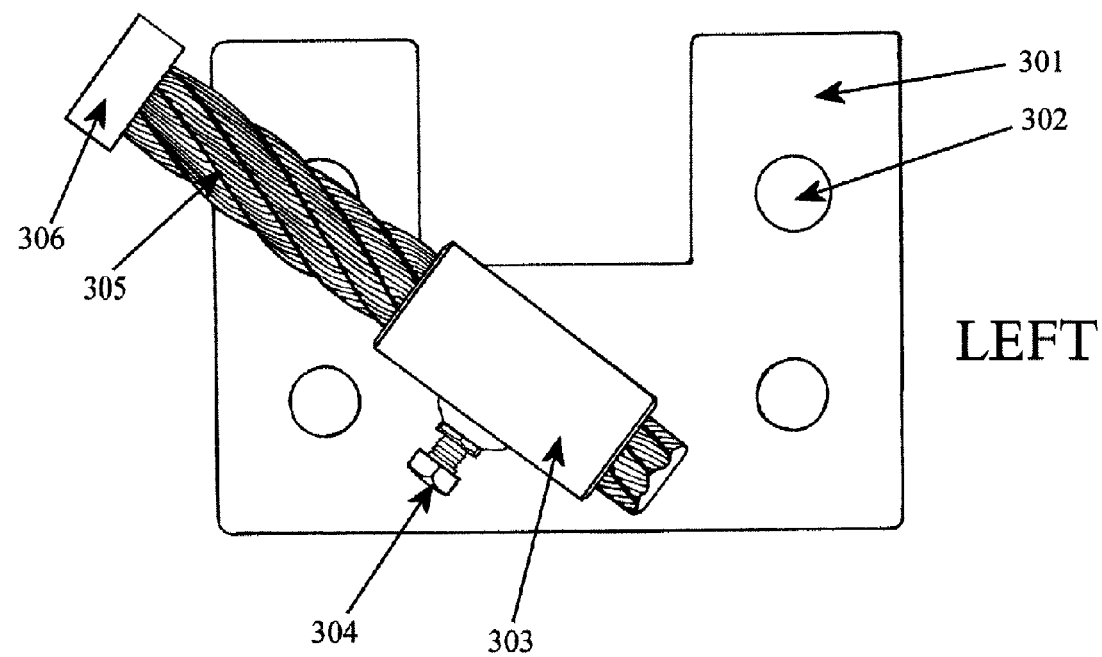
FIG. 3 is a view of a pair of left (L) and right (R) side bolt-on bracket plates, with a U-shaped plate configuration, four (4) hold bolt pattern, with flexible wire cables directed at an angle and mounted with an adjustable spacer fixture for use in the pipeline padding machine elevator self-cleaning system.
Figure 3:
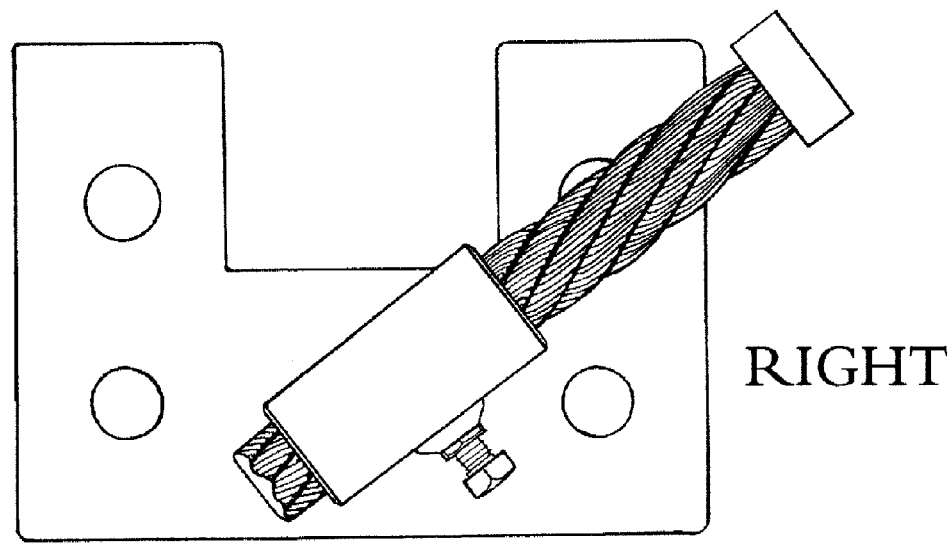

In FIG. 3, a pair of U-shaped left (L) and right (R) side brackets are shown for use in the pipeline padding machine elevator self-cleaning system, or for a padding machine cleated feeder conveyor/loader self-cleaning system. The U-shaped mounting plate 301 is designed to fit the elevator flight plates or loader/conveyor cleats with a four (4) bolt hole pattern 302. The flexible wire cable 305 is directed at an angle to engage the built up clay or soil in the space or channel gap between the elevator flights or the conveyor cleats and the side wall. A cap 306 is mounted at the end of the cable 305 in order to prevent fraying and to improve clay, mud, soil, and material removal from the machine. The length of the cable is adjusted via the set screw 304. An adjustable spacer fixture 303 secures the flexible wire cable 305 to the U-shaped mounting plate 301. The brackets are available in left (L) and right (R) side pairs for installation onto the left and right sides, respectively, of the elevator flight plates or loading conveyor cleats of the padding machine.

Figure 4:
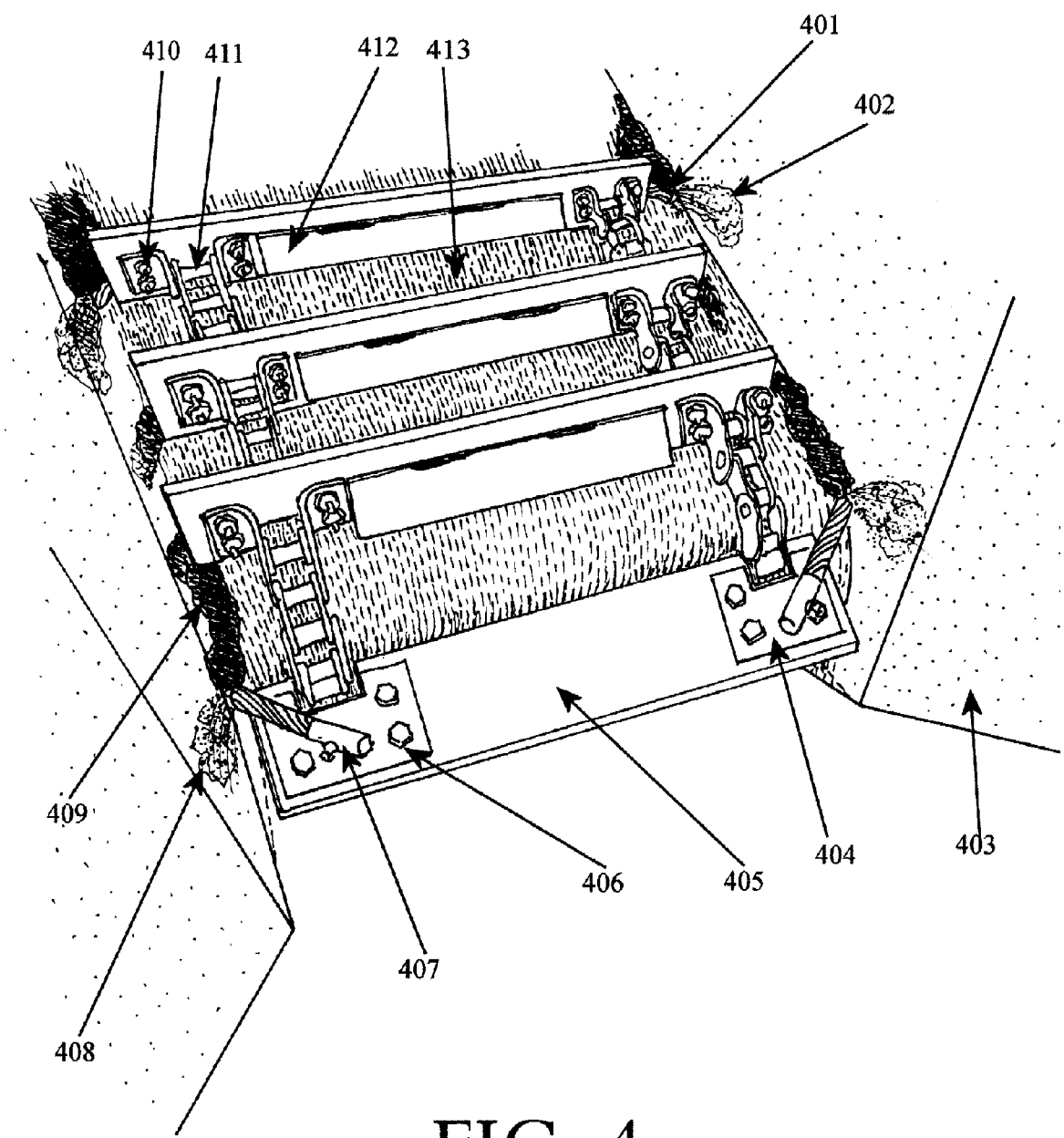
FIG. 4 is a detailed view of the pipeline padding machine self-loading elevator or cleated feed conveyor for loading backfill material with the self-cleaning system installed on the elevator flights or feeder conveyor cleats. The flexible wire cables are directed at an angle to engage the space between the elevator flights or conveyor cleats and the side wall, therefore self-cleaning built up clay, mud and soil as the elevator or conveyor turns.
Figure 5:
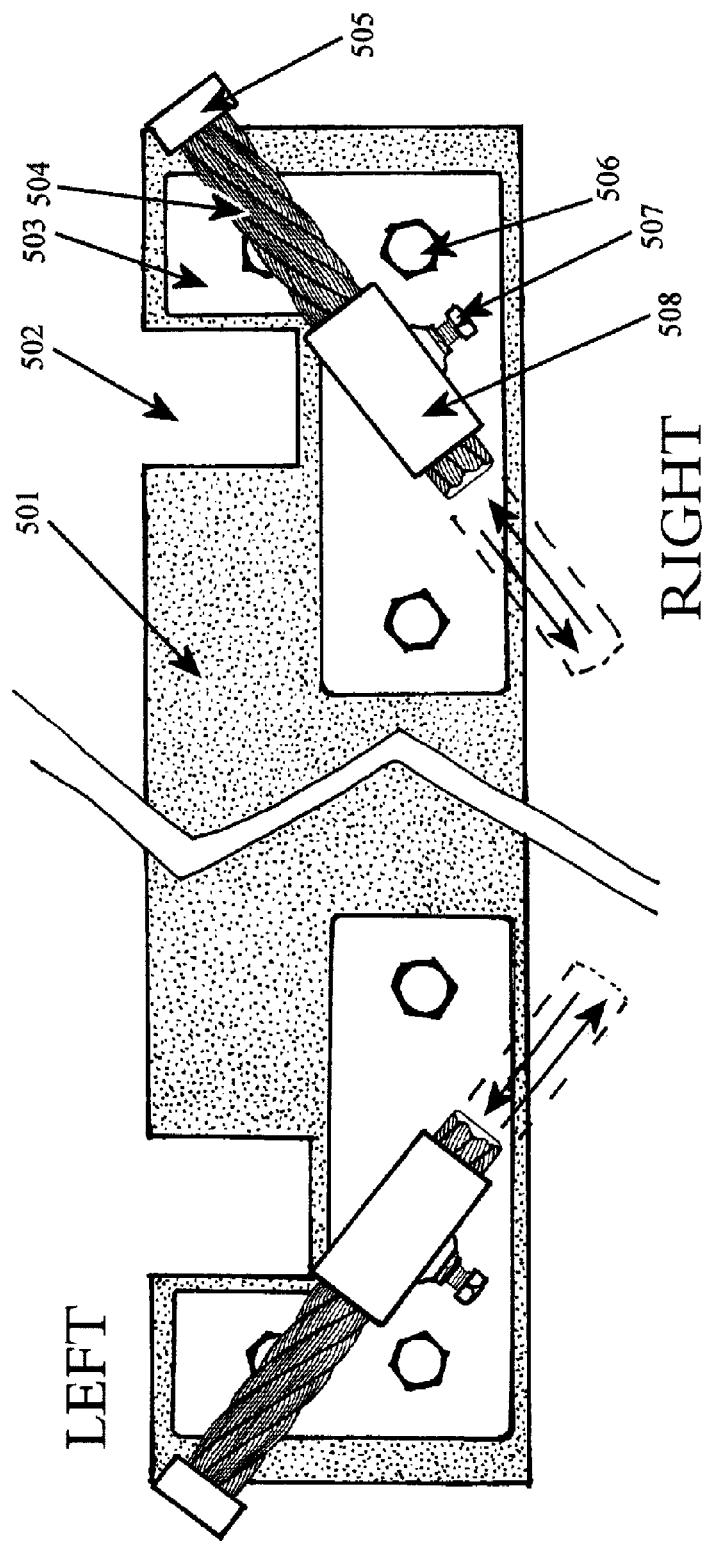
FIG. 5 is view of a pair of left (L) and right (R) side bracket plates installed onto a pipeline padding machine elevator flight plate. The L-shaped brackets are mounted with a three (3) bolt hole pattern configuration with flexible wire cables directed at an angle to engage the space between the elevator flight and the elevator side wall. The length and position of the cables is adjustable via the spacer fixture and set screw.

In FIG. 4 the pipeline padding machine loading elevator or cleated conveyor loader/feeder is shown for picking up and loading or elevating backfill material into the padding machine. The loader or elevator lifts soil and backfill material up by the scooping action of the endless loading conveyor or elevator which turns upwards and engages the backfill with the elevator flights or conveyor cleats 405, 412. As the drive chain 411 travels upwards, the elevator flights 405 pick-up soil and backfill material and elevate the material into the padding machine for screening and sorting out rocks and other debris. However, mud, clay and wet soil typically becomes clogged 401, 402, 408, and 409 in the space between the elevator flights 405 and the elevator side wall 403. The presently described brackets are installed and bolted on 406, 410 on the left side 406 and the right side 404 of the elevator flight. The flexible wire cable 407 is directed at an angle to engage the built up soil or clay 408 and 409 in the space between the elevator flight 405 and the elevator side wall 403. As the elevator flight 405 travels upwards and around the endless conveyor 413 via the drive chain 411, the built up clay and mud 401, 402, 408, and 409 are automatically and continuously self-cleaned by the upwards turning movement of the elevator drive mechanism 411.

In FIG. the left and right side of the elevator flight plate 501 is shown with the bracket 503 installed and mounted to each side respectively. The elevator flight 501 is the part of the padding machine elevator which lifts up the soil and backfill material into the machine for screening, rock removal, and eventual discharge over the pipeline in the trench. Padding machines also refer to this part as a cleat 501 as part of a cleated conveyor or self-loading mechanism for picking up the backfill material or soil and loading it into the padding machine for processing, screening, rock removal, etc. The L-shaped brackets are installed with a three (3) bolt pattern 506 designed to fit on the elevator flight 501 existing bolt pattern and around the cutaway 502 for the elevator drive chain. No further modification of the padding machine is required beyond simple bolt-on installation to the elevator flight plate or the self-loading conveyor cleat plate. The steel mounting plate 503 comprises an adjustable spacer fixture 508 for securing the flexible wire cable 504. The length and position of the cable may be adjusted with the set screw 507 in order to properly place and engage the wire cable into the gap or channel space between the elevator flight plate 501 and the elevator side wall. Arrows near the adjustable spacer fixture 508 indicate the direction of travel, i.e., slide back and forth, when adjusting the length and position of the wire cable 504. The wire cable 504 is mounted at an angle to maximize the effectiveness of the bracket in engaging the built-up material and for maximum material removal efficiency. The end of the flexible wire cable 504 is capped with a round cap 505 in order to prevent wear and tear and fraying of the wire cable, as well as to improve engagement and removal of built up clay, mud and soil.

Figure 6:
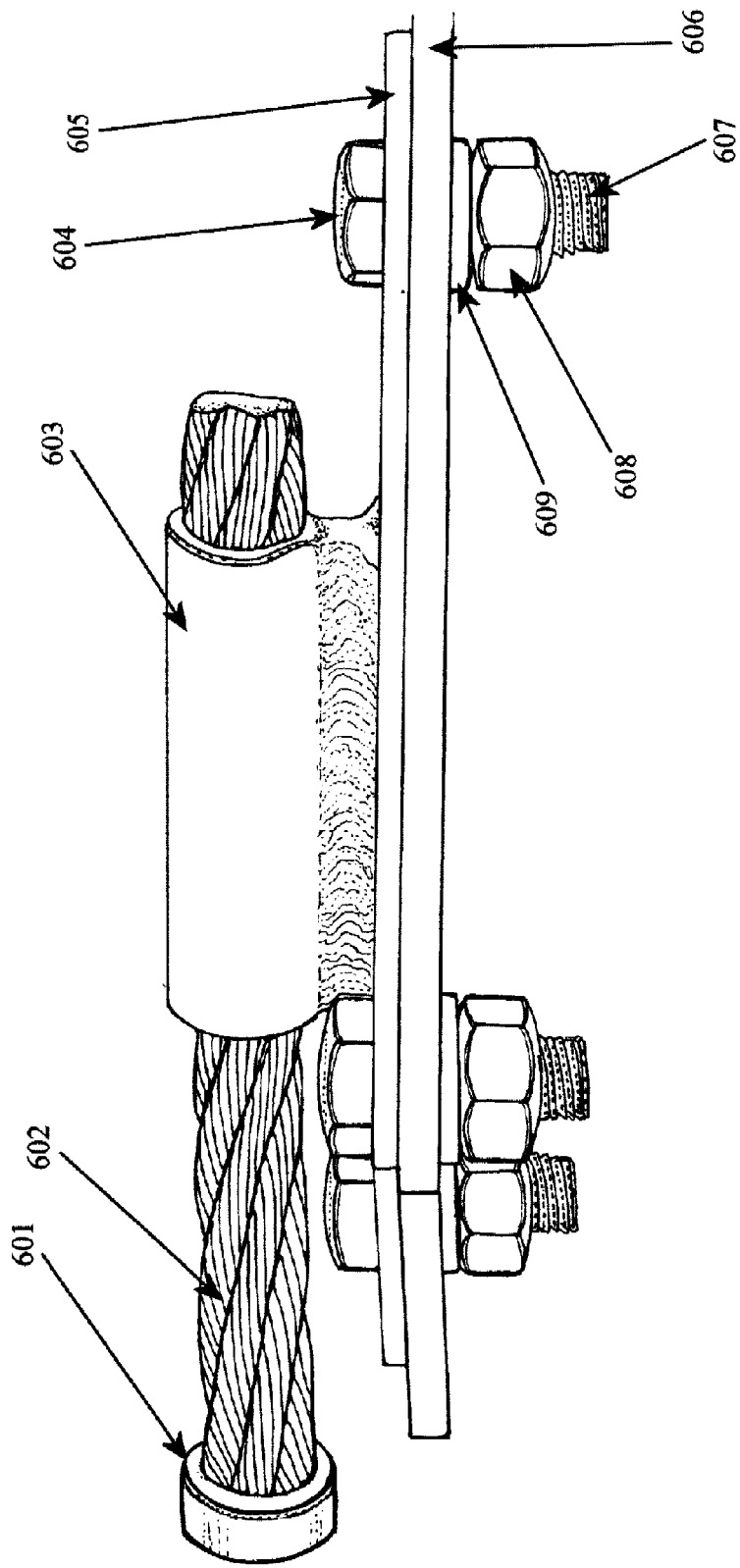
FIG. 6 is a side profile of a single bracket plate and flexible wire cable system with an L-shaped mounting plate, three (3) hole bolt pattern configuration, adjustable spacer fixture with set screw, and flexible wire cable with end cap. The L-shaped mounting plate is shown installed onto the elevator flight plate.

A side view profile of the bracket is provided in FIG. 6 showing the bracket plate 605 mounted to the elevator flight plate 606 with a bolt 604, washer 609, nut 608 and bolt threaded end 607. The bracket is an L-shaped configuration with a three (3) bolt pattern configuration. The flexible wire cable 602 is mounted to the bracket plate 605 with the adjustable spacer fixture 603. The cap 601 at the end of the flexible wire cable 602 prevents fraying of the cable and improves material removal and engagement during use. FIG. 6 shows the overall simple bolt-on installation of the bracket plate 605 to the elevator flight plate 606 or self-loading conveyor cleat plate 606.

Figure 7:
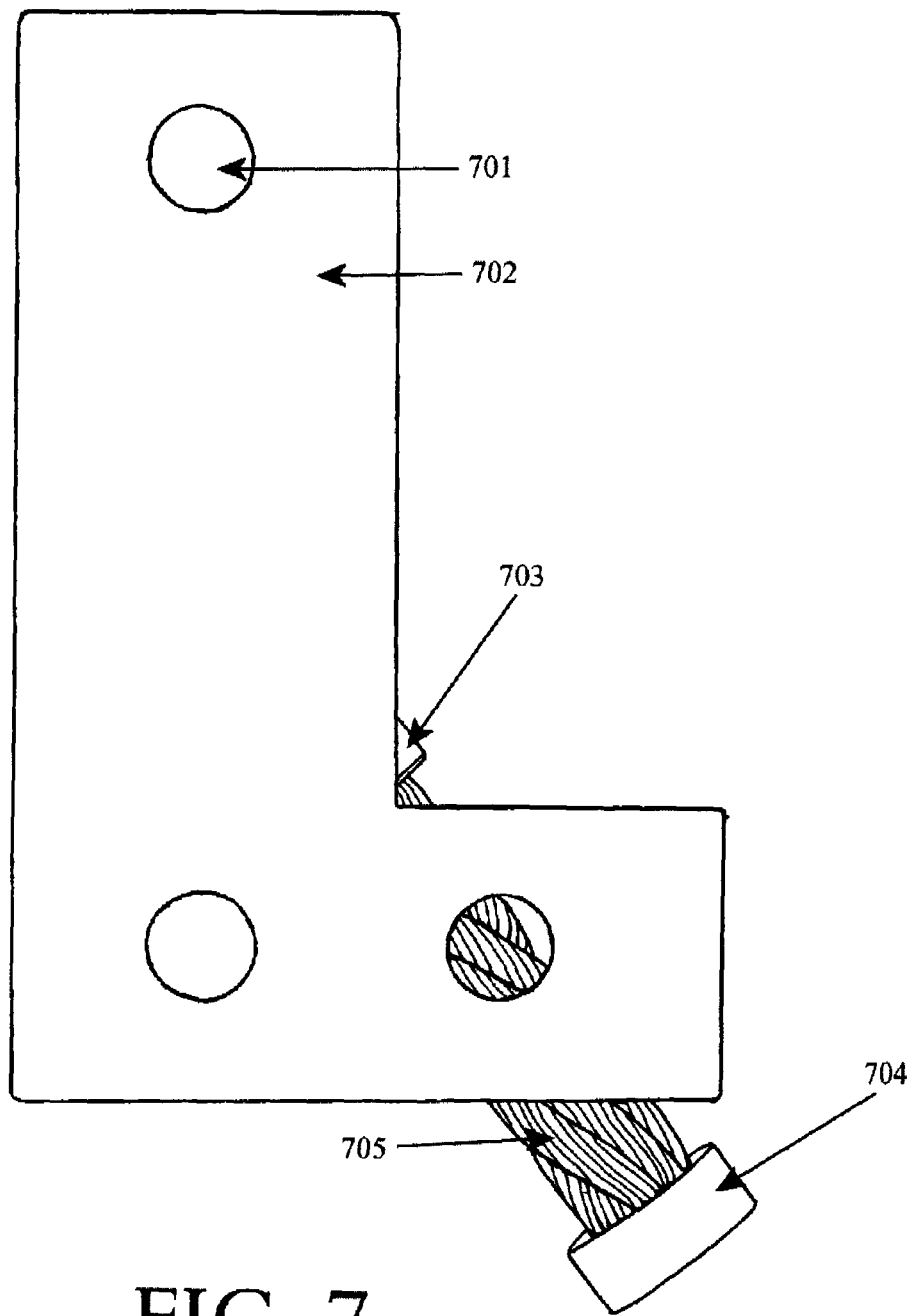
FIG. 7 is an underside view of a single bracket plate and flexible wire cable system with an L-shaped mounting plate, three (3) hole bolt pattern configuration, with the flexible wire cable and end cap visible from the front side. The underside of the mounting plate is to be mated with the elevator flight plate and is designed to fit the bolt pattern of the elevator flight plate without further modification.

FIG. 7 is an underside view of the L-shaped bracket 702 showing the three (3) hole bolt pattern 701 for installation onto an elevator flight plate or self-loading conveyor cleat plate. The underside 702 will be mated with the surface of the elevator flight plate with the three (3) bolt pattern specifically designed to fit the elevator flight plate bolt pattern. The adjustable fixture 703 secures the flexible wire cable 705 to the bracket plate 702 and directs the cable at an angle and appropriate position to engage the built-up clay, mud and soil in the space between the elevator flight and the elevator side wall. The end of the flexible wire cable 705 is capped 704 in order to prevent fraying and to improve overall functionality of the system.

Figure 8:
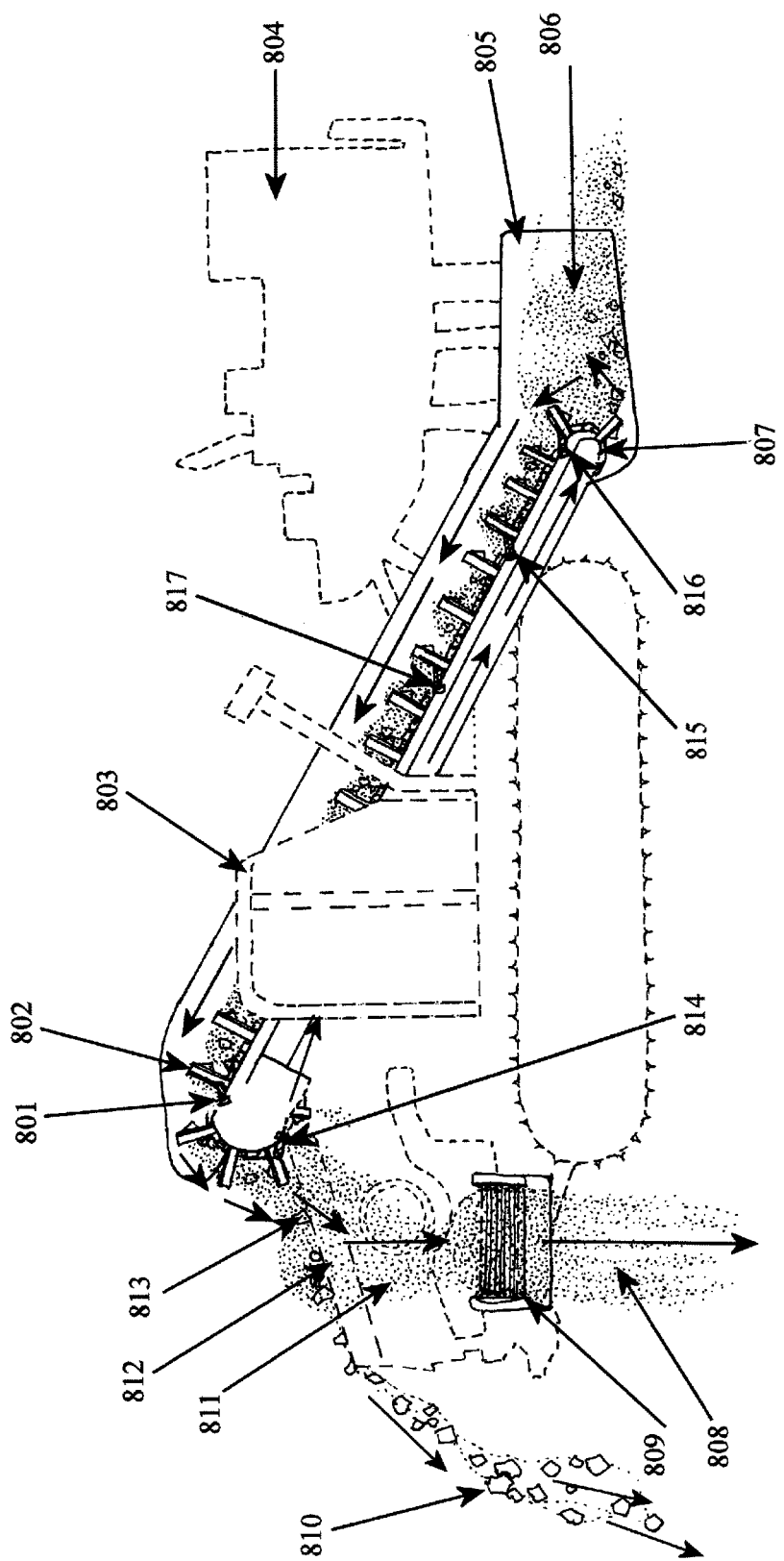
FIG. 8 is side profile view of a pipeline padding machine in operation with the presently described elevator self-cleaning system installed. The backfill soil is loaded into the machine via the front-loading elevator or cleated feeder conveyor, while the installed elevator self-cleaning system brackets and flexible wire cables engage and clear away built up clay, mud and soil from the space or gap between the elevator flights and the elevator side wall. The padding machine is therefore able to operate for longer periods of time without shutdown for cleaning and carefully screened backfill material is discharged into the pipeline trench, while rocks and other debris are ejected.

FIG. 8 is a big picture view of a pipeline padding machine 803, 804 with the elevator self-cleaning system installed 801, 814, 815, 816, and 817. At the frontend, the padding machine loads and ingests backfill material and soil 806 into the machine by engaging the soil 806 with the elevator 807. As the elevator 807 turns upwards (see FIG. 8 arrows indicating direction of travel) the backfill material 806 is lifted up, ingested and brought into the machine for screening and removal of rocks and other debris 810. The padding machine may alternatively comprise a self-loading feeder or cleated conveyor 807 for lifting up the backfill 806 and bringing it into the machine for processing. At the backend, the padding machine screens 812, 813 the backfill material and removes rocks and other debris 810. The backfill 811 is further processed and moved onto a side or cross conveyor 809 for discharge of the end product, which is finely grained soil 808, without rocks or debris, onto the pipeline in the trench for burial. During operation on heavy clay, mud, or wet soil, build up will occur between the elevator flights 802 on the elevator 807 and the elevator side wall 805. Particularly the build-up occurs in the gap or channel space between the elevator flights 802 and side wall 805. The padding machine is equipped with the elevator self-cleaning system installed in pairs of brackets 801 on the left (L) and right (R) side of the elevator flights 802 and preferably at every third elevator flight 814, 815, 816, and 817. As the elevator turns upwards, the bracket(s) 801, 814, 815, 816, and 817 engage the flexible wire cables at a directed angle into the clay, mud and soil build up in the gap or channel space between the elevator flights 802 and the elevator side wall 805. The upwards travel of the elevator flights and the bracket system removes and clears away the excess material, clay, and mud, allowing for longer machine operation before shutdown for power washing and cleaning.

Figure 9:
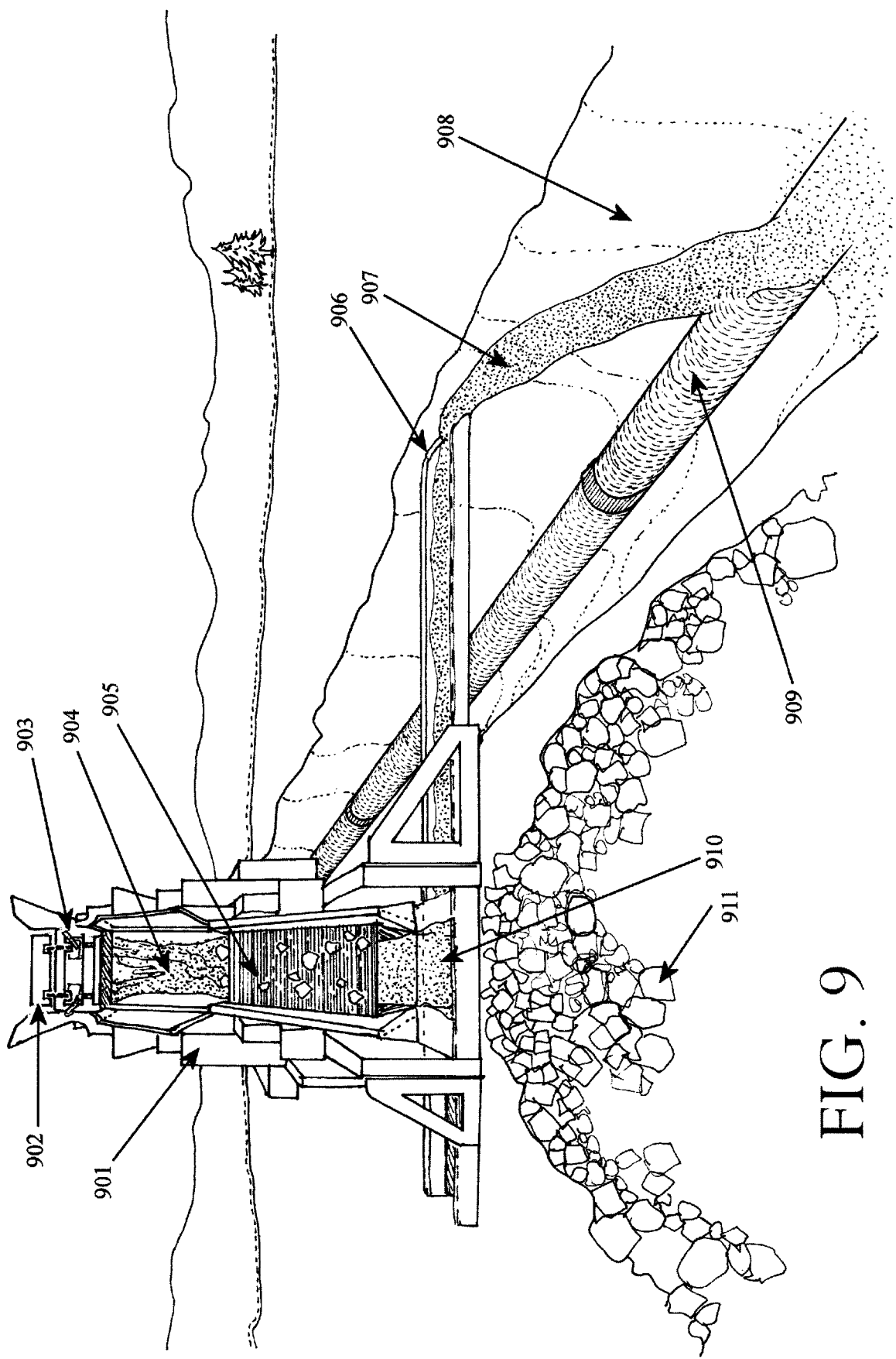
FIG. 9 is an overall big picture view of a pipeline padding machine in operation at the work site. The front loading elevator or self-loading cleated conveyor lifts up backfill soil into the machine, the installed elevator self-cleaning system brackets improve operation of the machinery and prevent mud, clay and soil built up, and carefully screened backfill material is discharged over the pipeline trench while rocks and debris are kept away from critical pipeline infrastructure.

FIG. 9 is a view of a pipeline padding machine 901 in operation and deployed at the worksite and assisting in the important job of backfilling and burying the pipeline infrastructure 909 while ensuring that rocks and other debris 911 are screened from the process. The padding machine loading elevator flights or cleated conveyor 902 lifts up backfill material near the pipeline trench and processes and screens the soil for rocks and other debris 911. As the elevator or cleated loading conveyor turns via the drive mechanism, the installed brackets and flexible wire cables 903 rotate around the loading area and self-clean the space or channel gap between the elevator flights or cleats 902 and the elevator side wall. Heavy soils, mud, and clay, which tend to build up the space or channel gap are automatically and continuously removed and cleared away by the engaging flexible wire cables 903. The padding machine is able to operate for longer periods of time before shutdown for cleaning and power washing. Backfill material is elevated into the machine and screened and processed 904, 905, and 910, while rocks and debris are ejected 911, and while soft padding material and backfill 907, are discharged into the pipeline trench 908 via the cross conveyor 906. The critical pipeline infrastructure 909 is carefully padded and buried and pipeline integrity, welds, valves, components and anti-corrosive coatings are maintained.

The invention claimed is:

1. A pipeline padding machine elevator self-cleaning system comprising:
   a steel mounting plate with a bolt pattern designed to be installed on a pipeline padding machine elevator comprising a plurality of flights;
   a flexible wire cable directed at an angle to engage built up soil or clay in a space between the elevator flights and an elevator side wall; and
   an adjustable spacer fixture for securing the flexible wire cable to the mounting plate, wherein the spacer fixture provides for adjusting the cable and a clearance between the cable and elevator side wall;
   wherein the system is installed by bolting onto at least one of the elevator flights;
   wherein the system is driven upwards and around the elevator by an elevator drive mechanism; and wherein the upwards travel engages the flexible wire cable into the built up soil or clay, removing debris that would occur between the flights and the side wall of the elevator and allows the padding machine to be operated for longer periods of time before stoppage for cleaning and power washing.

2. The pipeline padding machine elevator self-cleaning system of claim 1, wherein the space between the elevator flights and the elevator side wall is automatically and continuously self-cleaned of soil, mud, clay, and other debris by upwards movement of the elevator drive mechanism and the engagement of the flexible wire cable into the space.

3. The pipeline padding machine elevator self-cleaning system of claim 1, wherein the flexible wire cable may be removable and configurable with an alternative flexible wire cable of different diameter, length or material.

4. The pipeline padding machine elevator self-cleaning system of claim 1, wherein the mounting plate shape and bolt pattern is designed to fit a variety of different elevator flight shapes and bolt patterns.

5. The pipeline padding machine elevator self-cleaning system of claim 1, wherein the adjustable spacer fixture sets parameters comprising a length, a height and an angle of the flexible wire cable and the clearance between the cable and elevator side wall.

6. The pipeline padding machine elevator self-cleaning system of claim 1, wherein the system is capable of having multiple installed pairs.

7. The pipeline padding machine elevator self-cleaning system of claim 1, wherein the debris between the flights and the side wall of the elevator is pushed out of the space between the elevator flights and the elevator side wall.

* * * * *